Figure 1:
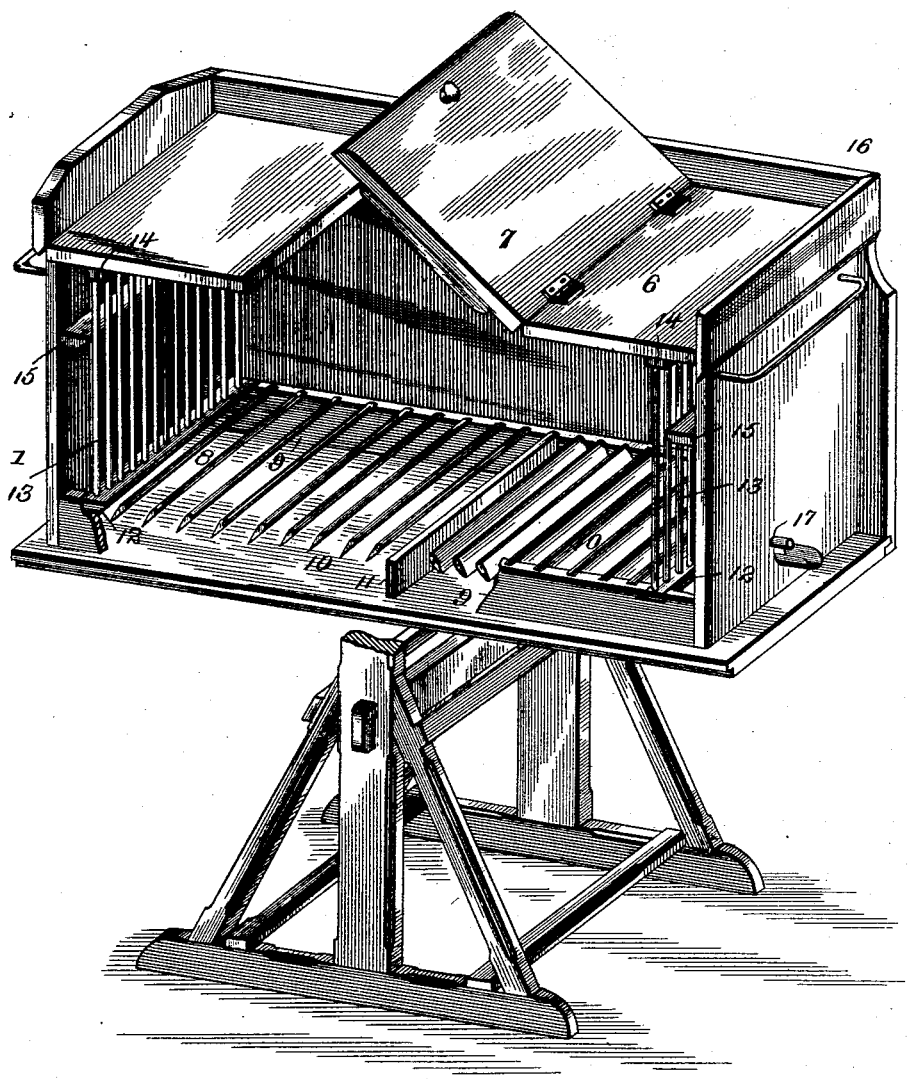

(No Model.)

W. R. McPHERRON.
WASHING MACHINE.

No. 570,709.

2 Sheets—Sheet 1.

Patented Nov. 3, 1896.

Witnesses
Simon Messer.
Frank Barry.

Inventor
William R. McPherron
by Bishop & Imirie
Attorneys.

THE NORRIS PETERS CO., PHOTO-LITHO., WASHINGTON, D. C.

(No Model.) 2 Sheets—Sheet 2.
W. R. McPHERRON.
WASHING MACHINE.
No. 570,709. Patented Nov. 3, 1896.
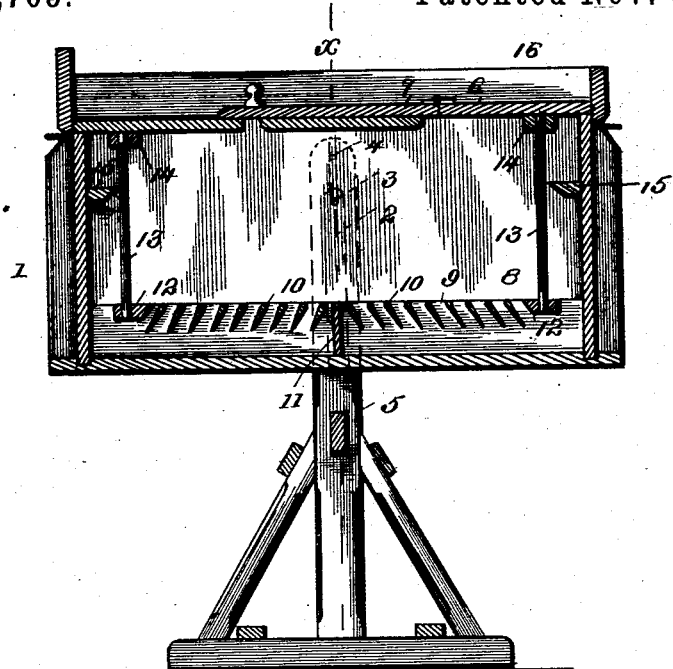
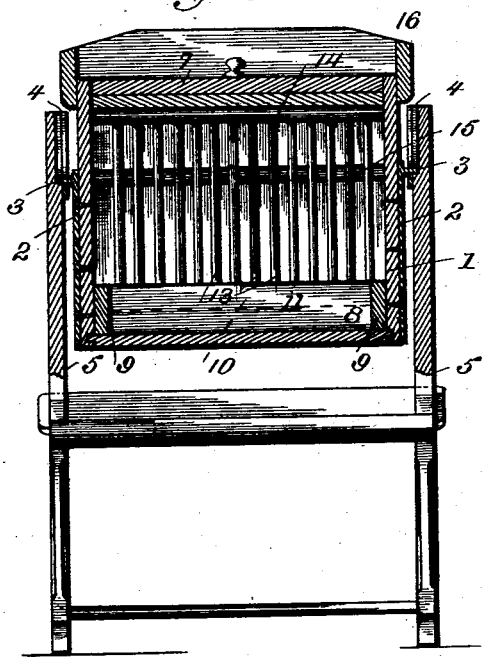
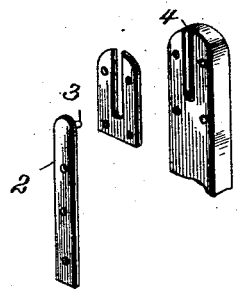
Witnesses
Simon Messer.
Frank Barry.
Inventor
William R. McPherron
by Bishop & Imirie
Attorneys.

UNITED STATES PATENT OFFICE.

WILLIAM R. McPHERRON, OF JACKSONVILLE, ILLINOIS, ASSIGNOR OF ONE-HALF TO WILLIAM F. DAVIS, OF SAME PLACE.

WASHING-MACHINE.

SPECIFICATION forming part of Letters Patent No. 570,709, dated November 3, 1896.

Application filed August 5, 1895. Serial No. 558,266. (No model.)

*To all whom it may concern:*

Be it known that I, WILLIAM R. MCPHERRON, a citizen of the United States, residing at Jacksonville, in the county of Morgan and State of Illinois, have invented certain new and useful Improvements in Washing-Machines; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in washing-machines; and it consists in so arranging an inner supplemental frame within the box, tank, or tub as to cause the water to act on the clothes and cleanse the same as the parts are oscillated.

The invention further consists in certain details, all of which will be hereinafter fully described and particularly pointed out.

In the drawings, Figure 1 is a perspective view of a washing-machine constructed in accordance with my invention, parts being broken away. Fig. 2 is a central longitudinal section of the same. Fig. 3 is a transverse section on the line x x of Fig. 2, and Fig. 4 is a detail view showing the manner of pivoting the box or tub.

In carrying out my invention I employ a box or tub 1, which may be of suitable form and of any preferred or desired size, but is preferably of a rectangular shape. On the sides of the tub I secure the plates 2, having the pivot-pins or trunnions 3 near their upper ends, which are adapted to enter the open-ended slots 4 in the upper extremities of standards 5 and rest on the bottoms of said slots, thereby pivotally supporting the tub. A cover 6 is secured to the box or tub and has the central portion thereof hinged to one of its end sections, forming a door 7, through which access may be had to the interior of the tub. A supplemental frame 8 is arranged within the tub. On the bottom of the tub at the side edges of the same I provide the longitudinal side bars 9, in the upper edges of which I secure the ends of the transverse slats or bars 10, said slats or bars being arranged in two series, which are inclined in opposite directions from the center of the machine, as shown most clearly in Fig. 2. Beneath the center of the frame formed by these side bars and transverse slats I secure the transverse solid bar 11, extending entirely across the space between the side of the tub and the slats and forming a breakwater to stop the flow of the water through said space.

Near the ends of the machine I secure in the upper edges of the side bars 9 the transverse bars 12, in which are secured the lower ends of the rods 13, which have their upper ends secured in a cross-bar 14, bearing against the under side of the cover or lid and the sides of the tub, as clearly shown. On the inner side of each end of the tub I secure the transverse bars 15, which project forward or inward to the rods 13 and have their inner edges beveled. These bars 15 form breakwaters to arrest the flow of water between the rods and the ends of the tub and direct the same inward onto and through the clothes.

Around the top of the machine I provide the flange 16, which prevents the overflow of any water which might possibly splash out of the tub, and one end of said flange serves as a rail to hold a wringer. A discharge-opening 17 is provided in one end of the tub to permit the used water to be drawn off, and is normally closed by a plug, as will be readily understood.

In operation the clothes are placed in the tub with the proper amount of soap and water and the tub is then oscillated. The water within the tub will thus be agitated and will permeate the entire quantity of clothing. As the end of the tub descends the water will run to the lower corner, and on the reverse movement of the tub it will flow out between the inclined slats onto the clothes, the central breakwater preventing it from merely flowing over the bottom of the tub. A portion of the water will be arrested by the end breakwater on the downward movement of the tub and will be thereby forced out between the vertical rods onto the clothes. Of course one end of the tub is up while the other is down, and consequently there is no time in the operation of the machine when water is not falling on some part of the clothes.

The inner frame holds the clothes away from the sides and bottom of the tub and insures a free space for the circulation of the water, and the breakwaters in said space act to cause a strong stream of water to be directed onto and through the clothes, so that they will be very rapidly and thoroughly cleansed with the expenditure of very little labor. By beveling the edges of the end breakwaters I cause the water to be directed slightly toward the top of the tub, so as to act on the upper portion of the clothes as well as the lower portions.

My improved machine is very simple in its construction, and its advantages are thought to be obvious from the foregoing description, taken in connection with the accompanying drawings.

Having thus described my invention, what I claim, and desire to secure by Letters Patent, is—

The combination with the oscillatory tub, of an inner frame consisting of longitudinal side bars secured on the bottom of the tub, transverse slats secured in the upper edges of said side bars, the slats on opposite sides of the transverse medial line of the tub being inclined downward toward the opposite ends of the tub, a solid transverse bar or breakwater secured between the longitudinal side bars on the medial transverse line of the tub and extending to the bottom of the tub, cross-bars secured upon and between the longitudinal side bars near the ends thereof, similar cross-bars secured in the tub at or near the top of the same, a series of vertical rods at both ends of the tub secured in and extending between the said cross-bars, and horizontal transverse bars or breakwaters secured to the ends of the tub near the top thereof and projecting toward the vertical rods.

In testimony whereof I affix my signature in presence of two witnesses.

WILLIAM R. McPHERRON.

Witnesses:
CHARLES A. BARNES,
M. FOX.